(12) United States Patent
Chou

(10) Patent No.: US 9,453,557 B2
(45) Date of Patent: Sep. 27, 2016

(54) RATCHET CHAIN BINDER

(71) Applicant: Yeh-Chien Chou, Taoyuan (TW)

(72) Inventor: Yeh-Chien Chou, Taoyuan (TW)

(73) Assignee: STRONG YUN INDUSTRIAL CO., LTD., Taoyuan (TW)

( * ) Notice: Subject to any disclaimer, the term of this patent is extended or adjusted under 35 U.S.C. 154(b) by 0 days.

(21) Appl. No.: 15/059,300

(22) Filed: Mar. 2, 2016

(65) Prior Publication Data

US 2016/0195165 A1    Jul. 7, 2016

Related U.S. Application Data

(63) Continuation-in-part of application No. 14/591,897, filed on Jan. 7, 2015, now abandoned.

(51) Int. Cl.
*F16G 11/12* (2006.01)
*F16H 31/00* (2006.01)
*F16H 25/20* (2006.01)

(52) U.S. Cl.
CPC ............. *F16G 11/12* (2013.01); *F16H 25/20* (2013.01); *F16H 31/005* (2013.01)

(58) Field of Classification Search
CPC ....... F16G 11/12; F16H 25/20; F16H 31/005
See application file for complete search history.

(56) References Cited

U.S. PATENT DOCUMENTS

| | | | | |
|---|---|---|---|---|
| 2,220,288 A * | 11/1940 | Sarosdy | ............. | F16D 41/16 254/232 |
| 3,338,359 A * | 8/1967 | Baillie | ............. | B60P 7/083 192/43.1 |
| 4,069,902 A * | 1/1978 | Zdeb | ............. | F16D 41/16 192/43 |
| 6,945,516 B1 * | 9/2005 | Scott | ............. | B60P 7/083 254/231 |
| 7,552,913 B1 * | 6/2009 | Amoss | ............. | F16G 11/12 254/233 |
| 2008/0118324 A1 * | 5/2008 | Fritel | ............. | F16G 11/12 410/100 |
| 2010/0111634 A1 * | 5/2010 | Wang | ............. | B60P 7/083 410/96 |
| 2011/0000317 A1 * | 1/2011 | Ruan | ............. | B60P 7/083 73/862.42 |
| 2013/0112929 A1 * | 5/2013 | Xiao | ............. | B60P 7/083 254/237 |
| 2013/0140124 A1 * | 6/2013 | Mitchell | ............. | B60P 7/083 192/43.1 |
| 2014/0109361 A1 * | 4/2014 | Helline | ............. | B60P 7/083 24/68 CD |
| 2014/0326935 A1 * | 11/2014 | Chao | ............. | B60P 7/083 254/235 |

* cited by examiner

*Primary Examiner* — Robert J Sandy
*Assistant Examiner* — David Upchurch

(57) ABSTRACT

The chain binder includes a main tube and two links separately screwed to the main tube. A U-shaped seat has two parallel side plates and a hollow portion and is pivoted by the main tube. A gear is fastened to the main tube and received in the hollow portion. A claw with two pairs of claw teeth and handle teeth is rotatably disposed between the two side plates. The claw and the gear compose a ratchet mechanism. A claw positioner is disposed on seat and is selectably inserted into a positioning hole of the claw. A lever set is rotatably and elastically connected to a U-shaped frame attached on the seat. The lever set will be rotatable when it is pulled out.

7 Claims, 8 Drawing Sheets

RATCHET CHAIN BINDER

CROSS-REFERENCE TO RELATED APPLICATIONS

This application is a continuation-in-part of U.S. patent application Ser. No. 14/591,897, filed Jan. 7, 2015, now pending.

BACKGROUND OF THE INVENTION

1. Technical Field

The invention relates to cargo straps, particularly to chain binders.

2. Related Art

A cargo strap is used for securing cargo in a truck to prevent cargo from flying or dropping. A cargo strap needs a binder to tighten. A conventional cargo strap binder is primarily composed of a main tube and two links. Two ends of the main tune are separately provided with two opposite inner threads. The two links are separately provided with two outer threads to be screwed in the main tube. An outer end of each link projects from the main tube. The two links will simultaneously outward stretch from or inward retract in the main tube. Thus the cargo strap can be tightened or loosened.

Such a binder is provided with a gear and a seat. The gear integrally connected on the main tube to be a single piece. The seat is rotatably connected on the main tube and the gear is received in the seat. The seat is further provided with a swingable claw to control rotation of the gear. The claw can be positioned by a claw positioner and adjusted to change relative relation between the claw and gear. A rotatable lever is pivoted on the seat. The claw will rotate the gear and main rube when the lever is pushed toward a specific direction, and the claw and the gear will become neutral when the lever is pushed an opposite direction so as to form a unidirectional ratchet effect.

However, such a binder has some drawbacks. First, the claw is arranged in the seat. When tightening or loosening the strap, the position of the claw must be adjusted to change the ratchet action direction. At this time, the user has to insert his or her finger into the seat to make this adjustment. This is very inconvenient and dangerous for users. Second, the lever must keep perpendicular to the main tube when operating. For the sake of safety, the lever must be rotated 90 degrees to be parallel to the main tube when not operating. However, those conventional binders do not provide any positioning or locking mechanism for the rotatable lever. As a result, the lever may still freely rotate because of vibration of truck transportation. This will be very dangerous.

SUMMARY OF THE INVENTION

An object of the invention is to provide a ratchet chain binder, whose claw can be adjusted outside the seat without inserting a finger into the seat. This can improve convenience and safety.

Another object of the invention is to provide a ratchet chain binder, whose lever is provided with a positioning mechanism. The positioning mechanism can automatically position the lever in a horizontal or vertical position to prevent the lever from undesiredly moving.

To accomplish the above objects, the ratchet chain binder of the invention includes a main tube and two links separately screwed to the main tube. A U-shaped seat has two parallel side plates and a hollow portion and is pivoted by the main tube. A gear is fastened to the main tube and received in the hollow portion. A claw with two pairs of claw teeth and handle teeth is rotatably disposed between the two side plates. The claw and the gear compose a ratchet mechanism. A claw positioner is disposed on seat and is selectably inserted into a positioning hole of the claw. A lever set is rotatably and elastically connected to a U-shaped frame attached on the seat. The lever set will be rotatable when it is pulled out.

DETAILED DESCRIPTION OF THE INVENTION

Figure 1:
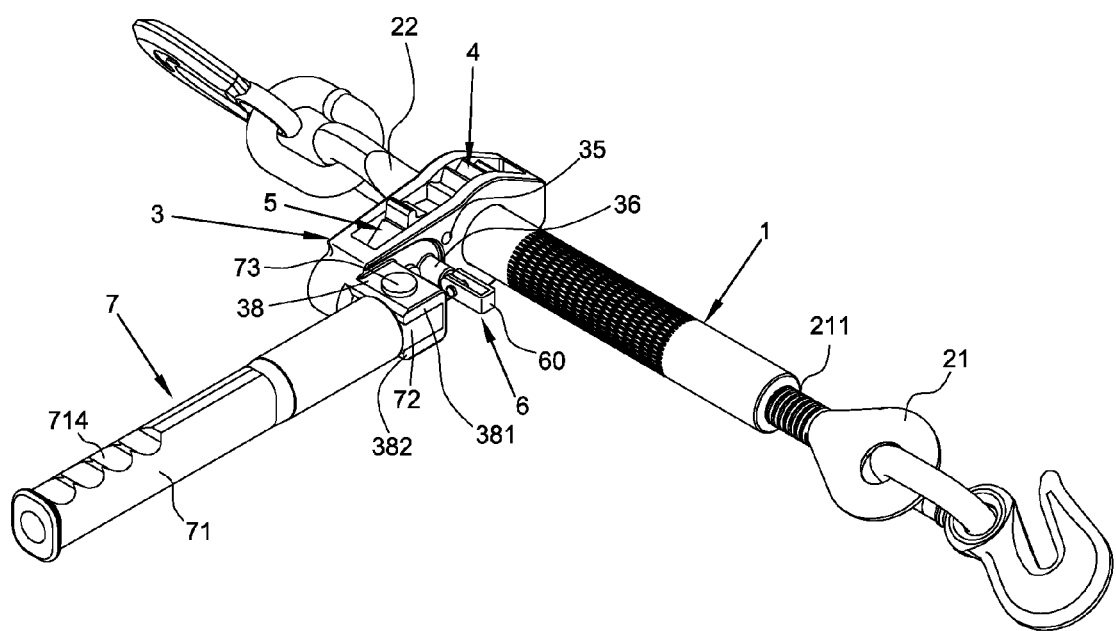
FIG. 1 is a perspective view of the invention.
Figure 2:
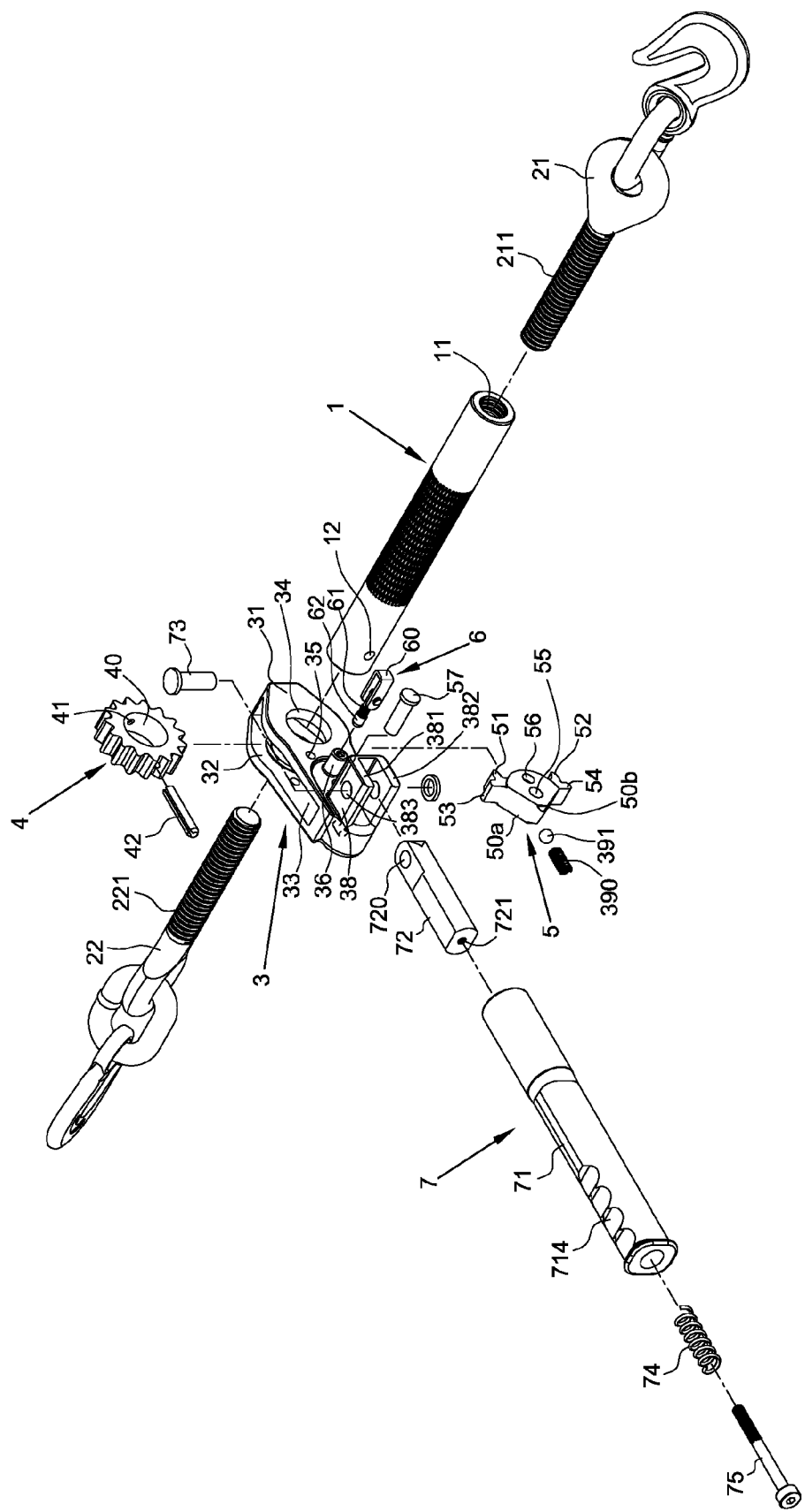
FIG. 2 is an exploded view of the invention.

Please refer to FIGS. 1 and 2. The invention provides a ratchet chain binder, which primarily includes a main tube 1 and two links 21, 22. Inner sides of two ends of the main tube 1 are separately provided with two opposite inner threads 11. The two links 21, 22 are separately provided with two outer threads 211, 221 for screwing with the inner threads 11 of the main tube 1. When the links 21, 22 are hooked by a chain (not shown) to be nonrotatable, rotating the main tube 1 can project or retract the link 21, 22 by the screwing operation.

A seat 3 is composed of two side plates 31, 32 and a hollow portion 33 therebetween. The two side plates 31, 32 are formed with two corresponding pivot holes 34 whose diameter is slightly greater than an outer diameter of the main tube 1 so that an end of the main tube 1 can pass through and rotate on the pivot holes 34. The two side plates 31, 32 are formed with one or two pair of lock holes 35 and two corresponding first shaft holes 37. One of the two side plates 31, 32 is provided with a cylinder 36 and a U-shaped frame 38. A central hole 360 of the cylinder 36 passes through the cylinder 36 and the side plate 31. The outer end of the cylinder 36 is formed with an inner flange 361 which shrinks a diameter of the central hole 360.

The cylinder 36 is used to be mounted by a claw positioner 6. The claw positioner 6 includes a handle bar 60, a spring 61 and a positioning bar 62. The spring 61 is axially placed in the central hole 360 and stopped by the inner flange 361. The positioning bar 62 is composed of a head 621 and a rod 620. The rod 620 is less than the head 621 in diameter so that the spring 61 can be put around the rod 620 and stopped by the head 621. An end of the handle bar 60 is formed into a U-shape for rotatably connecting with the positioning bar 62 by a pin 63. Thus the positioning bar 62 can pivot on the pin 63 against the cylinder 36.

The first shaft holes 37 are inserted by a shaft 57 to rotatably connect a claw 5. The bottom of the U-shaped frame 38 is attached on the side plate 31. Two side portions of the U-shaped frame 38 are formed with two corresponding second shaft holes 383 for connecting a lever set 7 and a blind hole 39 for receiving a first spring 390 and a ball 391. As a result, the ball 391 is normally pushed by the first spring 390.

A gear 4 is received in the hollow portion 33 of the seat 3 and sandwiched between the two side plates 31, 32. The gear 4 has a central hole 40 passed by and fastened to the main tube 1. The gear 4 is formed with a diameter through hole 41. The main tube 1 is formed with a radial through hole 12 corresponding to the diameter through hole 41. A bolt 42 is inserted into the diameter through hole 41 and the radial through hole 12 to fasten the gear 4 on the main tube 1.

A claw 5, which is of a V-shaped body having two sides 50a, 50b, is received in the seat 3 and is provided with a third shaft hole 55 and a positioning hole 56. Each of two ends of the claw 5 is formed with a claw tooth 51, 52 and a handle tooth 53, 54. The claw 5 is rotatably disposed between the two side plates 31, 32 by being pivoted on the shaft 57 passing the third shaft hole 55 and the first shaft holes 37. The two handle teeth 53, 54 protrude from the seat 3. A tip portion of the V-shaped body is normally flexibly pressed by the ball 391 and the first spring 390.

The lever set 7 includes a base rod 72, a handle tube 71, a second spring 74 and a bolt 75. The base rod 72 is rotatably connected to the U-shaped frame 38. In detail, an end of the base rod 72 is provided with a third shaft hole 720 corresponding to the second shaft holes 373 of the U-shaped frame 38 for being passed by a pivot 73. An outer end of the base rod 72 is provided with an axial threaded hole 721. The handle tube 71 is longer than the base rod 72 in length. One end of the handle tube 71 is axially and slidably connected around the base rod 72. A stopper 711 with a passing hole 710 is fixed in the middle of the handle tube 71 to divide the inside of the handle tube 71 into two partitions 712, 713. The first partition 712 is used to receive the base rod 72. The second spring 74 is received in the second partition 713 of the handle tube 71 and stopped by the stopper 711. The bolt 75 axially passes through the second spring 74 and the passing hole 710 to be screwed to the threaded hole 721 of the base rod 72. The bolt 75 has a rod portion and a head portion. The second spring 74 is compressed between the stopper 711 and the head portion. As a result, the handle tube 71 is normally pushed by the second spring 74 to abut against the U-shaped frame 38. The handle tube 71 will be rotatable when it is pulled out to compress the second spring 74. Additionally, the handle tube 71 may be provided with waved recesses 714 for firmly gripping.

Figure 3:
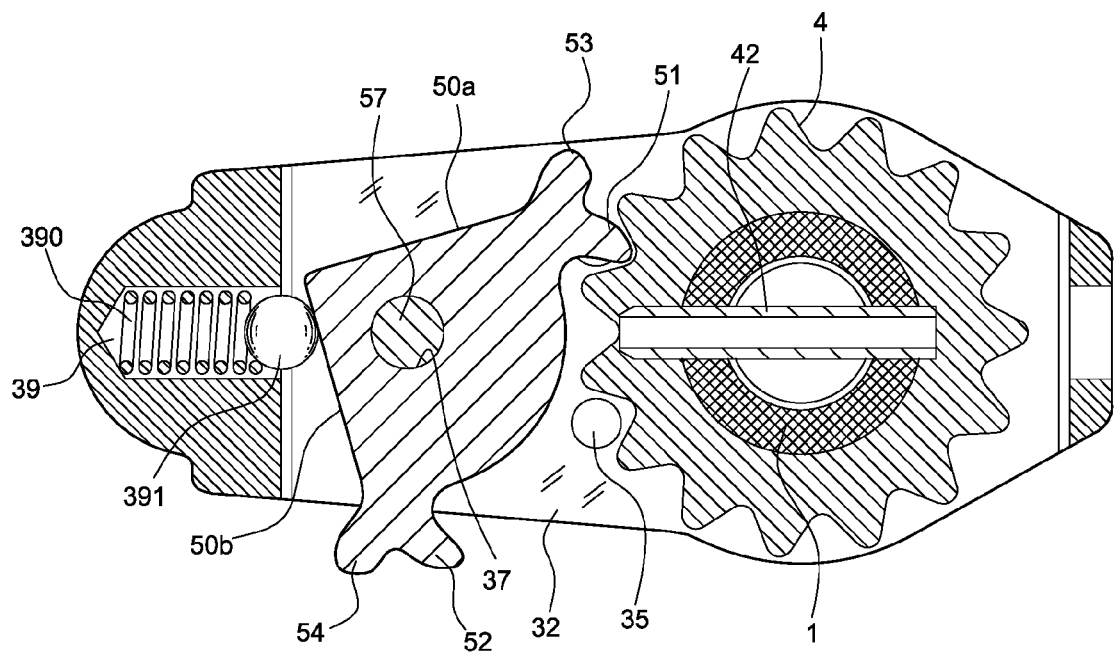
FIG. 3 is a first longitudinal section view of the ratchet mechanism of the invention.
Figure 4:
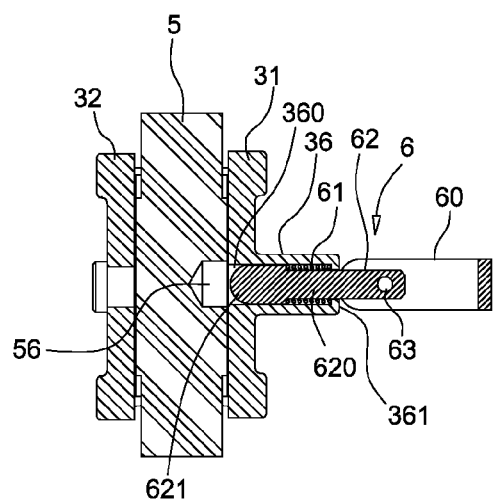
FIG. 4 is a first cross sectional view of the ratchet mechanism of the invention in the second status.
Figure 5:
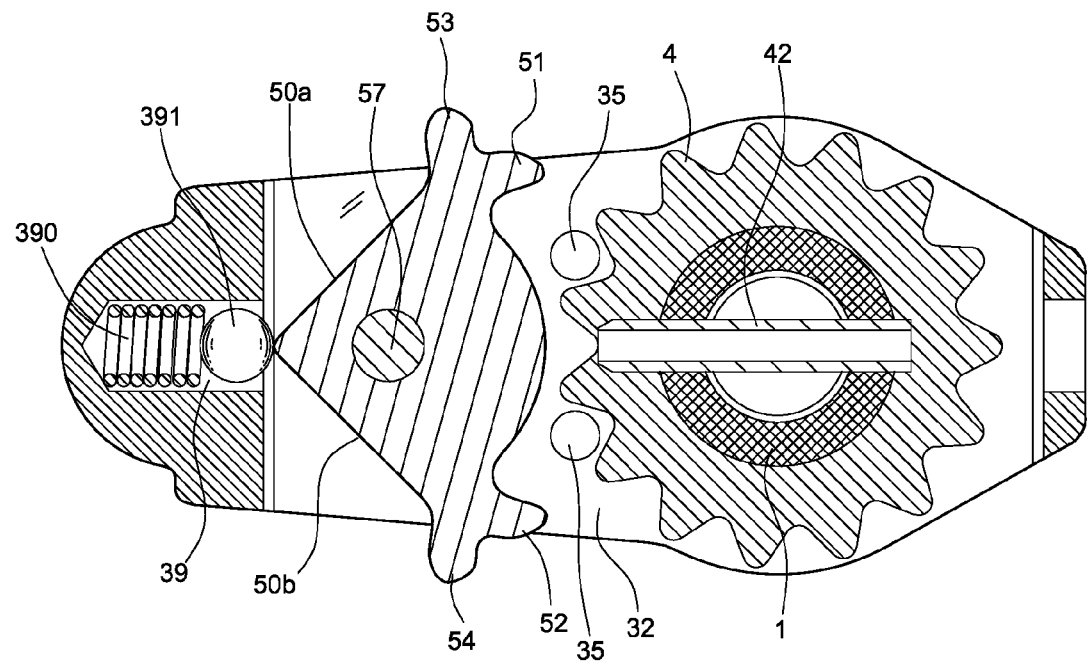
FIG. 5 is a second longitudinal section view of the ratchet mechanism of the invention.
Figure 6:
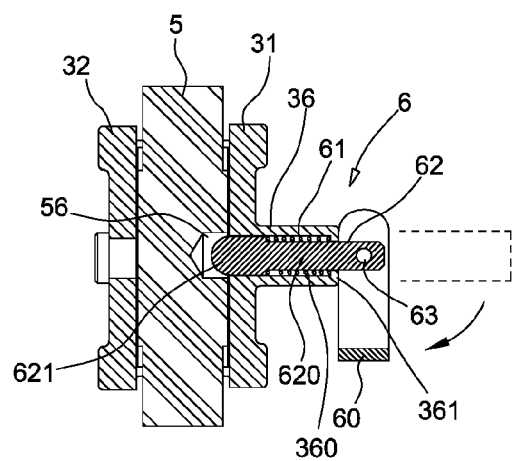
FIG. 6 is a second cross sectional view of the ratchet mechanism of the invention.

Please refer to FIGS. 3-6. When the handle bar 60 is moved to a position at which it aligns with the cylinder 36 as shown in FIG. 4, the positioning bar 62 is pulled out by the spring 61 to withdraw from the positioning hole 56 of the claw 5, so that the claw 5 becomes movable and the gear 4 becomes unidirectionally rotatable as shown in FIG. 3. In other words, the claw 5 and the gear 4 compose a ratchet mechanism. When the handle bar 60 is moved to a position at which it is perpendicular to the cylinder 36 as shown in FIG. 6, the positioning bar 62 is pushed by the spring 61 to enter the positioning hole 56 of the claw 5, so that the claw 5 becomes unmovable and the gear 4 becomes bidirectionally rotatable without engagement and limitation of the claw 5. As a result, the gear 4 and the main tube 1 can be fast bidirectionally rotated without rotation tooth by tooth as shown in FIG. 5.

Figure 7:
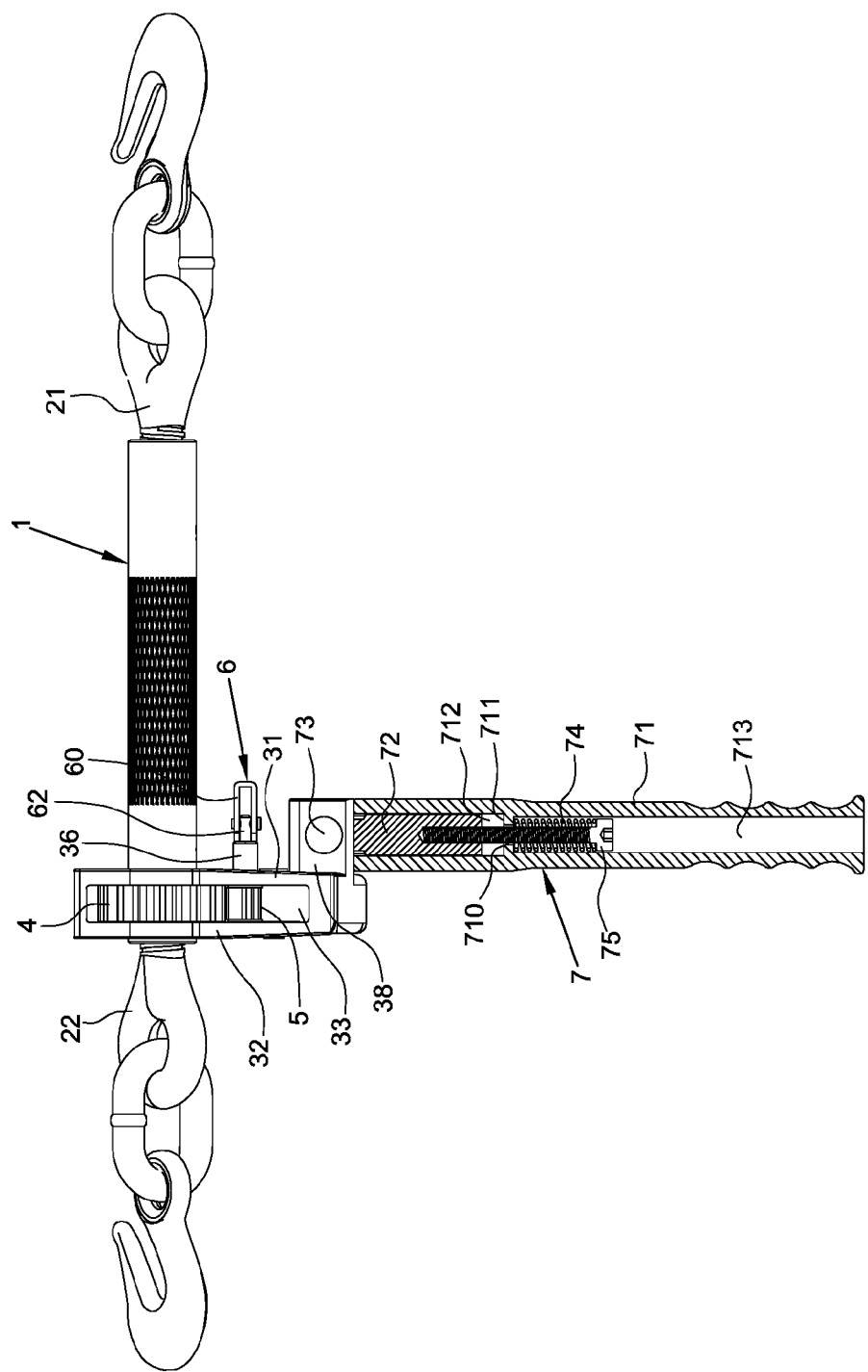
FIG. 7-9 show inner operation of the lever set of the invention.
Figure 8:
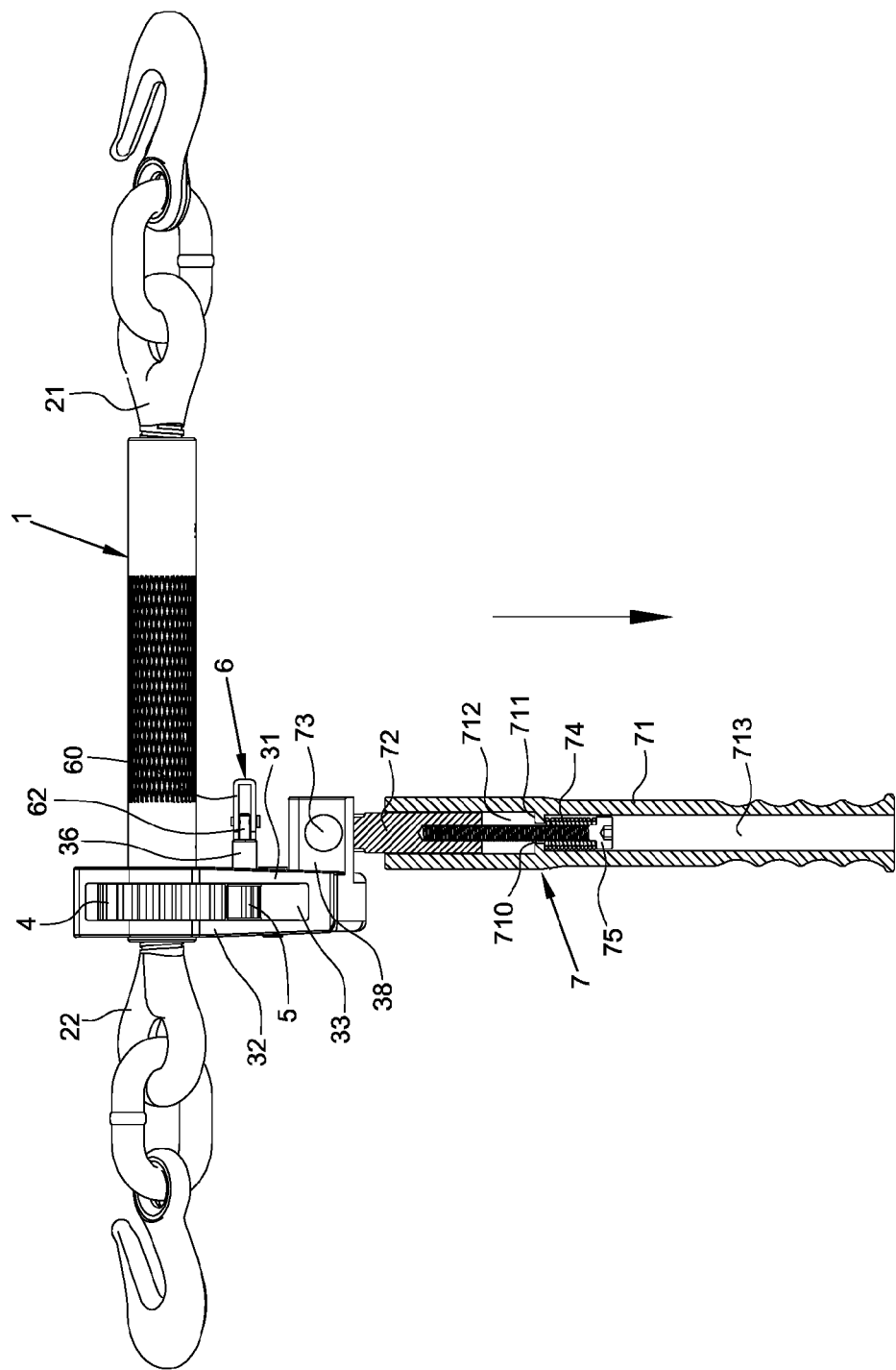
Figure 9:
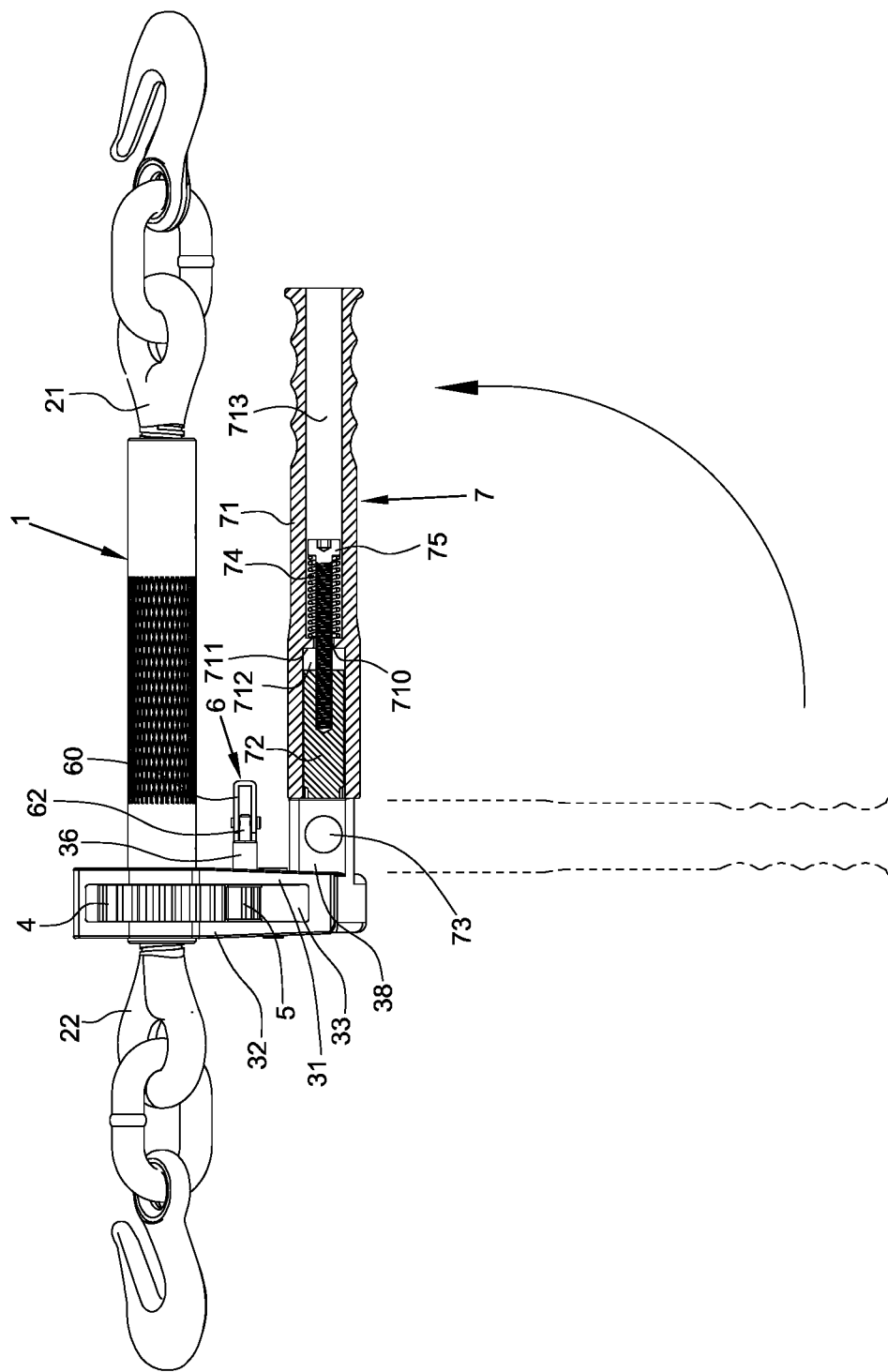

Please refer to FIGS. 7-9. When a user wants to rotate the lever set 7, he or she only needs to pull out the handle tube 71. At this time, the second spring 74 will be further compressed, and the handle tube 71 can temporarily withdraw from the U-shaped frame 38 to become rotatable. After the handle tube 71 has been rotated 90 degrees to stop applying a force to the handle tube 71, the handle tube 71 will automatically restore to abut against the U-shaped frame 38 to form another positioning effect. No matter where the lever set 7 is positioned, it cannot freely rotate. Thus safety can be kept.

It is noted that the handle teeth 53, 54 protruding from the seat 3 may be directly pushed by a user. That is, the claw 5 can be moved by a user without inserting his or her fingers into the seat 1 to avoid risk and save effort.

Figure 10:
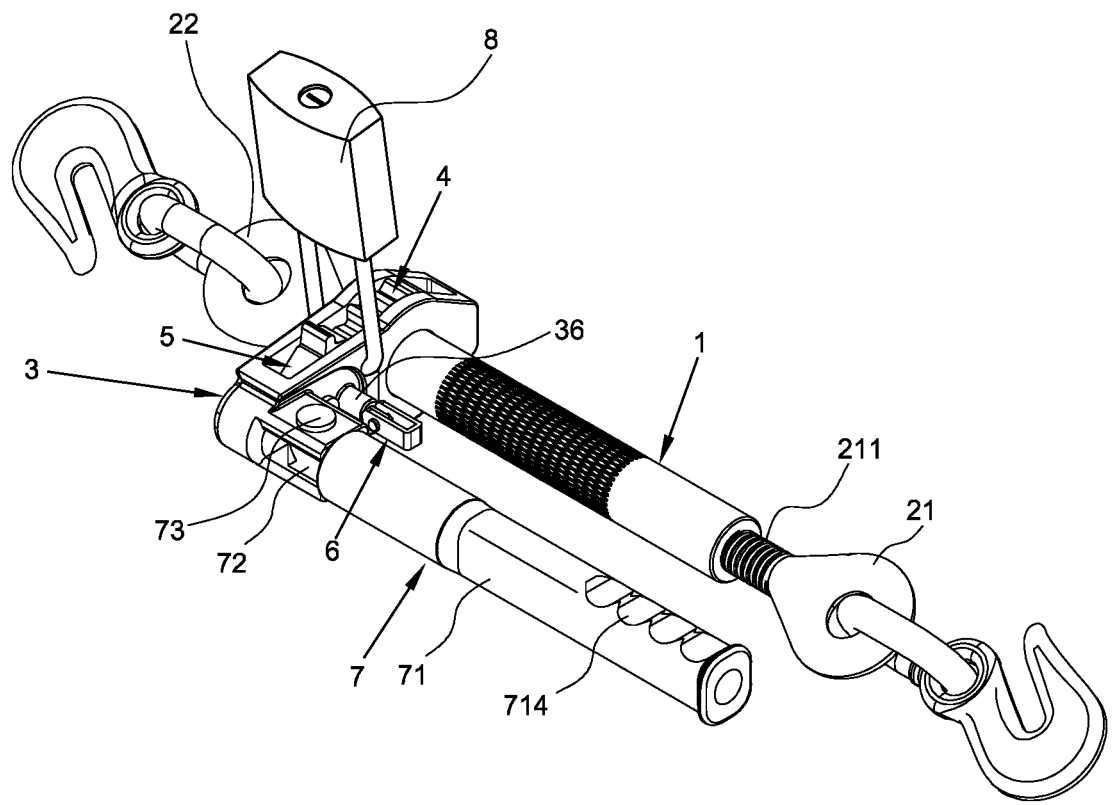
FIG. 10 is a schematic view of the invention with an additional lock.

The lock holes 35 are used to be passed through by a lock 8 to make theftproof as shown in FIG. 10.

It will be appreciated by persons skilled in the art that the above embodiment has been described by way of example only and not in any limitative sense, and that various alterations and modifications are possible without departure from the scope of the invention as defined by the appended claims.

What is claimed is:

1. A ratchet chain binder comprising:
a main tube, having two opposite inner threads;
two links, each having an outer thread for being screwed in the main tube;
a seat, being of a U-shaped hollow body having two parallel side plates and a hollow portion therebetween, the two side plates being formed with two corresponding pivot holes pivoted by an end of the main tube and two corresponding first shaft holes, one of the two side plates being provided with a cylinder and a U-shaped frame, and two side portions of the U-shaped frame being formed with two corresponding second shaft holes and a blind hole receiving a first spring and a ball;
a gear, having a central hole passed by and fastened to the main tube, received in the hollow portion and sandwiched between the two side plates;
a claw, being of a V-shaped body, being provided with a third shaft hole and a positioning hole, each of two ends of the V-shaped body being formed with a claw tooth and a handle tooth, and rotatably disposed between the two side plates by being pivoted on a shaft passing the third shaft hole, wherein the two handle teeth protrude from the seat, and a tip portion of the V-shaped body is normally flexibly pressed by the ball and the first spring;
a claw positioner, disposed at the cylinder, passing through the cylinder, and selectably inserted into the positioning hole; and
a lever set comprising:
a base rod, rotatably connected to the second shaft holes of the U-shaped frame, and an outer end thereof being provided with an axial threaded hole;
a handle tube, longer than the base rod in length, one end of the handle tube being axially and slidably connected around the base rod, wherein a stopper with a passing hole is fixed in the handle tube;
a second spring, received in the handle tube, and stopped by the stopper; and
a bolt, axially passing through the second spring and the passing hole to be screwed to the threaded hole of the base rod, and having a rod portion and a head portion, wherein the second spring is compressed between the stopper and the head portion, wherein the handle tube is normally pushed by the second spring to abut against the U-shaped frame, and the handle tube will be rotatable when it is pulled out to compress the second spring.

2. The ratchet chain binder of claim 1, wherein the gear is formed with a diameter through hole, the main tube is formed with a radial through hole corresponding to the diameter through hole, and a bolt is inserted into the diameter through hole and the radial through hole fasten the gear on the main tube.

3. The ratchet chain binder of claim 1, wherein the claw tooth and the handle tooth are connected into a V-shape.

4. The ratchet chain binder of claim 1, wherein the two side plates are further formed with a pair of lock holes.

5. The ratchet chain binder of claim 1, wherein the cylinder has a central hole, an outer end of the cylinder is formed with an inner flange which shrinks a diameter of the central hole, the claw positioner comprises a handle bar, a spring and a positioning bar, the spring is axially placed in the central hole and stopped by the inner flange, the positioning bar is composed of a head and a rod, the rod is less than the head in diameter so that the spring is put around the rod and stopped by the head, and an end of the handle bar is rotatably connected to the positioning bar.

6. The ratchet chain binder of claim 5, wherein an end of the handle bar is formed into a U-shape for rotatably connecting with the positioning bar by a pin.

7. The ratchet chain binder of claim 1, wherein a bottom of the U-shaped frame is attached on one of the side plates.

\* \* \* \* \*